United States Patent [19]

Igarashi et al.

[11] Patent Number: 4,998,564
[45] Date of Patent: Mar. 12, 1991

[54] REFRIGERANT-TRANSPORTING HOSE

[75] Inventors: Ichiro Igarashi, Komaki; Hiroaki Ito, Inuyama, both of Japan

[73] Assignee: Tokai Rubber Industries, Ltd., Aichi, Japan

[21] Appl. No.: 357,816

[22] Filed: May 30, 1989

[30] Foreign Application Priority Data

Jun. 6, 1988 [JP] Japan ................................ 63-138916

[51] Int. Cl.⁵ .............................................. F16L 9/14
[52] U.S. Cl. .................................. 138/126; 138/125; 138/127; 138/137
[58] Field of Search ............... 138/124, 125, 126, 127, 138/137

[56] References Cited

U.S. PATENT DOCUMENTS

| | | | |
|---|---|---|---|
| 2,899,982 | 8/1959 | Harpfer | 138/137 |
| 3,062,241 | 11/1962 | Brumbach | 138/125 |
| 3,540,486 | 11/1970 | Flounders | 138/125 |
| 3,861,973 | 1/1975 | Koch | 138/125 |
| 3,881,975 | 5/1975 | Koch | 138/125 |
| 4,410,661 | 10/1983 | Epstein et al. | 525/183 |
| 4,762,589 | 8/1988 | Akiyama et al. | 138/137 |
| 4,842,024 | 6/1989 | Palinchak | 138/125 |
| 4,862,923 | 9/1989 | Kitami et al. | 138/125 |
| 4,870,995 | 10/1989 | Igarashi et al. | 138/125 |
| 4,881,576 | 11/1989 | Kitami et al. | 138/125 |

FOREIGN PATENT DOCUMENTS 58-144168  9/1983  Japan .
60-41232   3/1985  Japan .

Primary Examiner—James E. Bryant, III
Attorney, Agent, or Firm—Oliff & Berridge

[57] ABSTRACT

A refrigerant-transporting hose including an elastic tube through which a refrigerant is transported, the elastic tube including a tubular resinous layer formed of a resinous composition, the resinous composition containing as a major component thereof a polyamide resin produced by reaction of hexamethylene diamine and an aliphatic dicarboxylic acid compound having from eight to sixteen carbon atoms. The resinous composition may contain as a major component thereof a mixture of saponified ethylene-vinyl acetate copolymer and a polyamide resin produced by reaction of hexamethylene diamine and an aliphatic dicarboxylic acid compound having from eight to sixteen carbon atoms.

13 Claims, 1 Drawing Sheet

REFRIGERANT-TRANSPORTING HOSE

BACKGROUND OF THE INVENTION

Field of the Invention

The present invention generally relates to a refrigerant-transporting hose and particularly to such hoses for use as piping of car coolers, air conditioners and the like which are employed in automotive vehicles.

Discussion of the Prior Art

Referring to FIG. 5, there is shown a conventional hose for transporting or conducting a refrigerant such as flon gas. The hose has a three-laminated or -layered structure consisting of an inner and an outer rubber tube 101, 103 and a reinforcing fiber layer 102 interposed between the inner and outer tubes 101, 103. The inner tube 101 is formed of acrylonitrile-butadiene rubber (NBR), chlorosulfonated polyethylene rubber (CSM) or the like, the reinforcing layer 102 is formed of polyester fiber or the like, and the outer tube 103 is formed of ethylene propylene diene rubber (EPDM), chloroprene rubber (CR) or the like. Reference numerals 115 designate spiking holes formed through the outer rubber tube 103 to communicate the reinforcing fiber layer 102 with outside space. The spiking holes 115 serve to relieve a fraction of the refrigerant which has permeated the inner rubber tube 101, into the outside space, thereby preventing the hose from being swollen due to the refrigerant gas otherwise trapped between the intermediate fiber layer 102 and the inner and/or outer rubber layers 101, 103. Thus, the hose is free from the problem of separation or peeling of each of the three laminates (two tubes and one layer) from the others due to the trapped refrigerant gas.

Since the hose as a whole is formed of rubber materials except for the reinforcing fiber layer 102, the hose has a high flexibility. Accordingly, the hose can be handled with ease, for example in providing a refrigerant-using device with piping. On the other hand, rubber materials have a comparatively high gas permeability, that is, a comparatively low gas impermeability. Thus, the rubber hose suffers from the problem of progressive leakage of the refrigerant gas conveyed therethrough. Therefore, it is necessary to often charge the refrigerant-using device with the refrigerant for compensating for lost fractions to maintain an optimum cooling capacity of the device. It goes without saying that that is very troublesome.

Recently, there is a tendency that refrigerant discharged from the compressor of a cooling system for an automotive engine has raised temperature, which tendency results from raised speed of rotation of the engine. There is also a tendency that ambient air around an engine has increased temperature, which tendency results from small-sized engine room. Thus, it is required that refrigerant-transporting hoses have an excellent heat resistance. However, the above-mentioned conventional rubber hose has the problem that cracks are likely to be produced in the inner rubber tube if the hose is used at raised temperature for a long period of time. That is, the hose does not have a reliable quality. In the case where hoses are formed of a rubber with a high heat resistance, such rubber has an unsatisfactory gas impermeability, resulting in the hoses produced with a low gas impermeability even as compared with the above-mentioned conventional hose.

As is apparent from the foregoing, the conventional hose is satisfactory with regard to flexibility, but unsatisfactory with regard to gas impermeability or heat resistance.

In the background described above, it has been proposed to form the inner tube of a hose of nylon 6, a resin material which is excellent in gas impermeability and heat resistance. However, the material has a high regidity, and when used for producing hoses the material extremely lowers the flexibility of the hoses. Thus, nylon 6 is not suitable for practical use. In the case where a resin with a lower rigidity, such as nylon 6-66 copolymer and nylon 6-12 copolymer, is used to impove the flexibility of hoses, such resins have a melting point considerably lower than nylon 6 and do not satisfy the requirement of sufficient heat resistance.

Thus, there has not been provided a refrigerant-transporting hose which is satisfactory all with regard to gas impermeability, flexibility and heat resistance.

SUMMARY OF THE INVENTION

It is therefore an object of the present invention to provide a refrigerant-transporting hose with improved gas impermeability and heat resistance without deteriorating its flexibility.

The Inventors have made studies and researches to seek for a material suitable for forming the inner tube of a refrigerant-transporting hose, by using various rubbers and resins, and have found that common polyamide resins such as nylon 6 and nylon 6-66 copolymer are not suitable and that a specific polyamide resin produced by condensation polymerization of hexamethylene diamine and an aliphatic dicarboxylic acid compound having 8 to 16 carbon atoms (hereinafter, referred to as "CPA resin"), is suitable for that purpose. That is, the CPA resin is satisfactory with regard to the three requirements, i.e. excellent gas impermeability, flexibility and heat resistance. Based on these findings the present invention has been developed.

According to a first aspect of the present invention, there is provided a refrigerant-transporting hose comprising an elastic tube through which a refrigerant is transported, the elastic tube including a tubular resinous layer formed of a resinous composition, the resinous composition containing as a major component thereof a polyamide resin produced by reaction of hexamethylene diamine and an aliphatic dicarboxylic acid compounding having from eight to sixteen.

The refrigerant-transporting hose constructed as described above is satisfactory with regard to gas impermeability, flexibility and heat resistance due to high gas impermeability, flexibility and heat resistance of the tubular resinous layer formed of the resinous composition containing the specific polyamide resin (CPA resin). Therefore, the instant hose is very suitable for use as piping of car coolers, air conditioners and other refrigerant-using devices which are required to maintain a high heat resistance, seal characteristics and gas impermeability for a long period of service.

The refrigerant-transporting hose of the invention may further comprise an outer tube of a rubber material located radially outwardly of the elastic tube, and a reinforcing fiber layer interposed between the elastic tube and the outer tube, such that the reinforcing fiber layer and the elastic and outer tubes constitute an integral tubular body.

In a preferred embodiment of the hose of the invention, the elastic tube further includes at least one of an inner rubber layer located radially inwardly of the tubular resinous layer, and an outer rubber layer located radially outwardly of the tubular resinous layer.

In another embodiment of the hose of the invention the aliphatic dicarboxylic acid is expressed by the following formula:

HOOC—R—COOH where R is an aliphatic residue having ranging from six to fourteen. In this embodiment, the aliphatic dicarboxylic acid may comprise at least one acid selected from the group consisting of suberic acid, azelaic acid, sebacic acid, undecanedicarboxylic acid, dodecanedicarboxylic acid, tridecanedicarboxylic acid, tetradecanedicarboxylic acid, pentadecanedicarboxylic acid, and hexadecanedicarboxylic acid. In particular, sebacic acid and dodecanedicarboxylic acid are suitable.

In yet another embodiment of the hose of the invention, the resinous composition consists of the polyamide resin. In this case, the resinous composition contains 100% of the polyamide resin.

In still another embodiment of the hose of the invention the resinous composition further contains saponified ethylene-vinyl acetate copolymer. In this embodiment, it is preferred that the resinous composition contain not more than 250 parts by weight of the saponified ethylene-vinyl acetate copolymer per 100 parts by weight of the polyamide resin. Also, it is recommended that the saponified ethylene-vinyl acetate copolymer contain not more than 40 mol% of ethylene and not less than 90 mol% of the vinyl acetate of the ethylene-vinyl acetate copolymer be saponified.

In a further embodiment of the hose of the invention the resinous composition further contains at least one rubber selected from the group consisting of CSM, CPE, CHC, CHR, Cl-IIR, EPDM, and NBR. In this embodiment, it is preferred that the resinous composition contain not more than 70 parts by weight of the at least one rubber per 100 parts by weight of the polyamide resin.

According to a feature of the hose of the invention, the tubular resinous layer has a thickness ranging from 0.05 to 1.0 mm.

According to a second aspect of the invention, there is provided a refrigerant-transporting hose comprising an elastic tube through which a refrigerant is transported, the elastic tube including a tubular resinous layer formed of a resinous composition, the resinous composition containing as a major component thereof a mixture of saponified ethylene-vinyl acetate copolymer and a polyamide resin produced by reaction of hexamethylene diamine and an aliphatic dicarboxylic acid compound having from eight to sixteen carbon atoms.

In a preferred embodiment of the hose of the invention, the resinous composition consists of the mixture. In this case, the resinous composition contains 100% of the mixture.

BRIEF DESCRIPTION OF THE DRAWINGS

The above and optional objects, features and advantages of the present invention will be better understood by reading the following detailed description of presently preferred embodiments of the invention, when considered in conjunction with the accompanying drawings, in which.

DETAILED DESCRIPTION OF THE PREFERRED EMBODIMENTS

Figure 1:
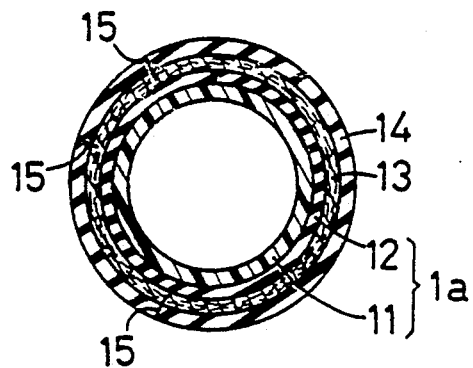
FIG. 1 is a transverse cross-sectional view of a refrigerant-transporting hose embodying the present invention.
Figure 5:
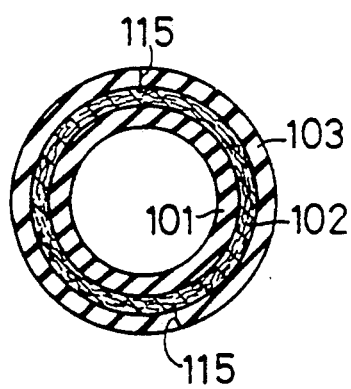
FIG. 5 is a transverse cross sectional view of a conventional hose.

Referring first to FIG. 1, there is shown a refrigerant-transporting hose embodying the present invention. The hose consists of an inner elastic tube 1a through which refrigerant is transported, an outer rubber tube 14 located radially outwardly of the inner elastic tube 1a, and a reinforcing fiber layer 13 interposed between the inner elastic tube 1a and the outer rubber tube 14 such that the fiber layer 13 and the inner and outer tubes 1a, 14 constitute an integral tubular body. The inner elastic tube 1a includes a resinous layer 11 formed of a resinous composition which contains as a major component thereof a specific polyamide resin (described in detail below). The inner tube 1a further includes an outer rubber layer 12 located radially outwardly of the resinous layer 11. The inner elastic tube 1a corresponds to the inner rubber tube 1 of the conventional hose of FIG. 5. Reference numerals 15 designate spiking holes formed through the outer rubber tube 14 so as to extend from an exposed, outer surface of the outer tube 14 to the fiber layer 13. The spiking holes 15 serve to prevent the refrigerant gas from being trapped between the four laminates 11, 12, 13, 14, by relieving the gas into outside space.

The resinous layer 11 is formed of the resinous composition containing as a major component a specific polyamide resin. The polyamide resin ("CPA resin") is produced by reaction (i.e., condensation polymerization) of hexamethylene diamine and an aliphatic dicarboxylic acid, and has an excellent gas impermeability and an excellent heat resistance, together with a higher flexibility than that of common resin materials such as nylon 6.

It is essential that the aliphatic dicarboxylic acid used for producing the CPA resin have 8 to 16 carbon atoms. The aliphatic dicarboxylic acid is expressed by the following formula:

HOOC—R—COOH where R is an aliphatic residue having 6 to 14 carbon atoms. In the case where the number of carbon atoms of the aliphatic residue R is less than six, the resinous layer formed of the composition containing the CPA resin produced by using such aliphatic dicarboxylic acid is so rigid that the flexibility of the produced hose as a whole is deteriorated. On the other hand, in the case where the number is more than fourteen, the resinous layer formed has a low melting point and suffers from a low gas impermeability. In either case, no satisfactory hose is produced.

As the aliphatic dicarboxylic acid having 8 to 16 carbon atoms, are preferably used suberic acid, azelaic acid, sebacic acid, undecanedicarboxylic acid, dodecanedicarboxylic acid, tridecanedicarboxylic acid, tetradecanedicarboxylic acid, pentadecanedicarboxylic acid, and hexadecanedicarboxylic acid. In particular, sebacic acid and dodecanedicarboxylic acid are suitable. These acids may be used singularly or in combination. In other words, the hexamethylene diamine is reacted with at least one of the acids to obtain the CPA resin.

The resinous composition containing as a major component thereof the CPA resin may further contain saponified ethylene-vinyl acetate copolymer.

The saponified ethylene-vinyl acetate copolymer has a heat resistance comparable to the CPA resin, and an excellent gas impermeability. Accordingly, if the copolymer is added to the resinous composition, the resinous layer 11 formed of the composition more effectively serves as a barrier to gas permeation therethrough, and the radial thickness of the resinous layer 11 may be reduced. Consequently, the flexibility of the hose produced is improved.

It is preferred that the resinous composition contain not more than 250 parts by weight of the saponified ethylene-vinyl acetate copolymer per 100 parts by weight of the CPA resin. If the proportion of the copolymer exceeds 250 parts by weight, the flexibility of the produced hose is lowered to an insufficient level, though the gas impermeability thereof is improved.

It is recommended that the saponified ethylenevinyl acetate copolymer contain not more than 40 mol% of ethylene and not less than 90 mol% of the vinyl acetate of the copolymer be saponified. If the proportion of the ethylene exceeds 40 mol%, or if the degree of saponification of the vinyl acetate is below 90 mol%, the heat resistance of the end product, i.e., the hose, tends to be insufficient.

The CPA resin and the saponified ethylene-vinyl acetate copolymer may be mixed with each other by a known, resin composition-preparing method. For example, pellets of the CPA resin and pellets of the copolymer are subjected to dry blend, and then kneaded by a twin-screw extruder.

In addition to the CPA resin, or the mixture of CPA and saponified ethylene-vinyl acetate copolymer, the resinous composition may further contain, if necessary, halogen-containing rubber such as chlorosulfonated polyethylene rubber (CSM), chlorinated polyethylene (CPE), epichlorohydrin rubber such as polymer of epichlorohydrin (CHC) and copolymer of epichlorohydrin and ethylene oxide (CHR) and chlorinated isobutylene-isoprene rubber (Cl-IIR), and/or rubber such as ethylene propylene diene rubber (EPDM), and acrylonitrile-butadiene rubber (NBR). In this case, it is preferred that the resinous composition contain not more than 70 parts by weight of the additional rubber per 100 parts by weight of the CPA resin. If the proportion of the rubber exceeds 70 parts by weight, the gas impermeability of the hose is reduced to an extent that it is insufficient.

It is recommended that the resinous layer 11 be formed to have a radial thickness ranging from 0.05 to 1.0 mm. If the thickness is below the lower limit 0.05 mm, the gas impermeability of the resinous layer 11 is reduced to an extent that it is insufficient. Meanwhile, if the thickness exceeds the upper limit 1.0 mm, the rigidity of the hose is adversely increased though the gas permeability thereof is improved. However, in view of purposes of the hoses, surroundings where the hoses are used, and properties of the other layers or tubes of the hoses, the thickness of the resinous layer 11 may be selected at an appropriate value outside the above range.

The outer rubber layer 12 of the inner elastic tube 1a is formed of a known rubber material as commonly used for forming an inner portion of a refrigerant transporting hose, such as NBR, CSM, EPDM, CPE, CHC, CHR and Cl-IIR.

The reinforcing fiber layer 13 is formed of a known fiber material as used for producing hoses, such as polyester fiber, aramid fiber, cotton fiber, or other synthetic or natural fibers. The fiber layer 13 is formed on the outer rubber layer 12 by braiding, spiralling or knitting using such fiber material.

The outer rubber tube 14 is exposed to ambient atmosphere. In view of weather resistance, heat resistance and water impermeability, the outer tube 14 is preferably formed of EPDM. However, other rubber materials may be used for forming the outer tube 14.

There will be described a method of manufacturing the instant refrigerant-transporting hose having the above-described laminated structure.

Initially, the resinous composition containing as a major component the CPA resin is molten by heat, and the heat-molten resin is extruded from a resin extruder on a rubber mandrel so as to provide a resinous layer 11 thereon, and then the resinous layer 11 is cooled.

Second, adhesive is applied to an outer surface of the resinous layer 11, and unvulcanized rubber composition for the outer rubber layer 12 is extruded from an extruder (not shown) thereon so as to provide a double-layered inner elastic tube.

Subsequently, adhesive is applied to an outer surface of the inner tube, and a reinforcing fiber layer 13 is formed thereon by braiding, spiralling or knitting with a suitable thread.

Next, adhesive is applied to an outer surface of the reinforcing fiber layer 13, and unvulcanized rubber composition is extruded from an extruder thereon so as to provide a outer rubber tube 14.

Lastly, the thus-obtained laminated tube is vulcanized to produce an integrally bonded end product, i.e. hose, and then the rubber mandrel is removed from the hose. The vulcanizing temperature is selected at 145° to 70° C., and the vulcanizing time is selected at 30 to 90 minutes.

In the above-described manufacturing method, the resinous layer 11 is formed such that the radial thickness thereof falls in the range of 0.05 to 1.0 mm, as previously mentioned.

It is preferred that the radial thickness of the outer rubber layer 12 fall in the range of 1 to 3 mm, because the outer layer 12 is required to flexibly support the resinous layer 11.

Further, it is recommended, in view of water impermeability, that the radial thickness of the outer rubber tube 14 fall in the range of 1 to 2.5 mm.

The thus-produced refrigerant-transporting hose is satisfactory all with regard to gas impermeability, flexibility and heat resistance because of the high gas impermeability, flexibility and heat resistance of the resinous layer 11 of the inner tube 1a which layer is formed of the resinous composition contaning as a major component the specific polyamide resin (CPA resin).

Figure 2:
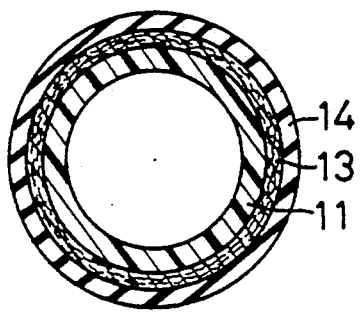
FIGS. 2 through 4 are transverse cross sectional views of other embodiments of the hose of the invention.
Figure 4:
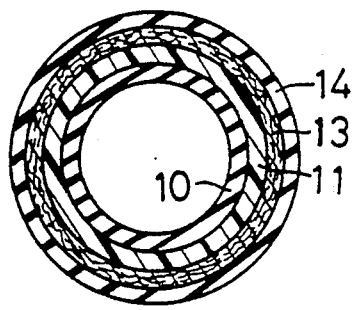
Figure 3:
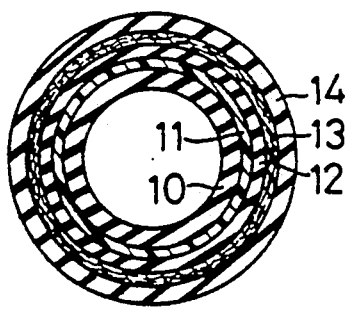

Referring next to FIGS. 2 to 4, there are shown other embodiments of the refrigerant-transporting hose of the present invention. The hoses of FIGS. 2–4 are different from the hose of FIG. 1 with respect to the arrangement of the inner elastic tube.

In FIG. 2, there is shown the hose whose inner tube consists of a single resinous layer 11 formed of the previously-described resinous composition containing as a major component the CPA resin.

In FIG. 3, there is shown the hose whose inner tube consists of a three-layered structure which includes an innermost rubber layer 10 and an outer rubber layer 12 between which a resinous layer 11 is interposed.

In FIG. 4, there is shown the hose whose inner tube consists of a resinous layer 11 and an innermost rubber layer 10 positioned radially inwardly of the resinous layer 11, in contrast to the inner tube la of the hose of FIG. 1.

The hoses of FIGS. 3 and 4 having the innermost rubber layer 10 are suitable for use with joints such as nipples, because those hoses have good seal characteristics with respect to the joints. Further, the smaller the number of the laminates of a hose, namely the simpler the construction of the hose, the lower the hose costs. The various hoses of FIGS. 1-4 are selectively used for various purposes or applications, so that each of the hoses can exhibit its characteristics most effectively.

EXAMPLES

Referring to TABLE I there are shown eight invention hoses (Examples 1 through 8) and three comparative hoses (Examples 9 through 11), which were manufactured by the previously-described method using the respective materials indicated in the table.

Each of the eleven hoses was tested with regard to flexibility, gas impermeability and heat resistance. The test results are shown in TABLE II.

The flexibility, gas impermeability and heat resistance were evaluated as follows:

FLEXIBILITY

Each of the eleven hoses was cut into a 300 and a 400 mm long specimen, and one of the opposite ends of each cut hose was fixed to a plate and the other end thereof was progressively bent to contact the plate. With the other end contacting the plate, the bending stress exerted to the other end was measured. The flexibility of the hoses was evaluated by measurements of the bending stress. Smaller measurement values indicate higher degrees of flexibility.

GAS IMPERMEABILITY

Each of the eleven hoses was cut into a 500 mm long specimen, and the cut hose was charged with 40 g of Flon 12 and gas-tightly sealed at opposite ends thereof. The gas-charged hose was maintained at 100° C. for 72 hours. Subsequently, the overall weight of the hose was measured, and was compared with its initial weight immediately after the charging of the Flon gas. The reduced amount (g) of the Flon gas, which had permeated through the wall of the hose into ambient atmosphere, was calculated. Smaller values indicate higher degrees of gas impermeability.

HEAT RESISTANCE

Each of the eleven hoses was cut into a 400 mm long specimen, and was placed in an oven at 140° C. for 168 hours. Subsequently the cut hose was wound around a mandrel with a radius of 50 mm, and was inspected for any cracks produced in the inner tube thereof.

TABLE I

| | | | INVENTION HOSES | | | | | | | | COMPARATIVE HOSES | | |
|---|---|---|---|---|---|---|---|---|---|---|---|---|---|
| | | | 1 | 2 | 3 | 4 | 5 | 6 | 7 | 8 | 9 | 10 | 11 |
| INNER TUBE | INNER RUBBER LAYER | MATERIAL | — | — | — | — | NBR | CSM | — | NBR | NBR | — | — |
| | | THICKNESS (mm) | — | — | — | — | 0.5 | 0.5 | — | 0.5 | 3.4 | — | — |
| | INTERMEDIATE RESINOUR LAYER | MATERIAL(S) | N1 | N2 | N2/E1 *1 | N2/E1 | N2/E2 | N2 | N2/CHR | (N2+E1 *2)/CHR | — | Ny6 *3 | Ny6-66 *4 |
| | | PARTS *5 OF MATERIALS | — | — | 100/40 | 100/200 | 100/40 | — | 100/40 | — | — | — | — |
| | | THICKNESS (mm) | 0.2 | 0.2 | 0.15 | 0.15 | 0.15 | 0.15 | 0.25 | 0.25 | — | 0.15 | 0.15 |
| | OUTER RUBBER LAYER | MATERIAL | NBR | NBR | NBR | NBR | NBR | CSM | NBR | NBR | — | NBR | NBR |
| | | THICKNESS (mm) | 1.0 | 1.0 | 1.0 | 1.0 | 1.0 | 1.0 | 1.0 | 1.0 | — | 1.0 | 1.0 |
| REINFORCING FIBER LAYER | | MATERIAL | PeF *6 | PeF | PeF | PeF | PeF | PeF | PeF | PeF | PeF | PeF | PeF |
| OUTER RUBBER TUBE | | MATERIAL | EDPM | EDPM | EDPM | EDPM | EDPM | EDPM | EDPM | EDPM | EDPM | EDPM | EDPM |
| | | THICKNESS (mm) | 1.4 | 1.4 | 1.4 | 1.4 | 1.4 | 1.4 | 1.4 | 1.4 | 1.4 | 1.4 | 1.4 |

N1: Polyamide resin (Condensated copolymer of hexamethylene diamine and sebacic acid)
N2: Polyamide resin (Condensated copolymer of hexamethylene diamine and didecanedicarboxylic acid)
E1: Saponified ethylene-vinyl acetate copolymer containing 32 mol % of ethylene and 95 mol % saponified vinyl acetate
E2: Saponified ethylene-vinyl acetate copolymer containing 38 mol % of ethylene and 90 mol % saponified vinyl acetate
*1: Mixture of N2 and E1 *2: The ratio of N2 to E1 (N2/E1) is 100 (parts by weight)/40 (parts by weight) *3: Nylon 6 *4: Nylon 6-66 copolymer *5: Parts by weight *6 Polyester fiber

TABLE II

| | | INVENTION HOSES | | | | | | | | COMPARATIVE HOSES | | |
|---|---|---|---|---|---|---|---|---|---|---|---|---|
| | | 1 | 2 | 3 | 4 | 5 | 6 | 7 | 8 | 9 | 10 | 11 |
| FLEXIBILITY (kgf) | LENGTH OF HOSES: 300 mm | 1.4 | 1.4 | 1.3 | 1.4 | 1.3 | 1.4 | 1.3 | 1.3 | 1.3 | 2.0 | 1.4 |
| | LENGTH OF HOSES: 400 mm | 0.7 | 0.8 | 0.8 | 0.8 | 0.8 | 0.9 | 0.8 | 0.8 | 0.6 | 1.0 | 0.8 |
| GAS IMPERMEABILITY (g/m/72 hours) | | 7 | 7 | 5 | 5 | 5 | 7 | 10 | 9 | 28 | 1 | 6 |
| HEAT RESISTANCE | | N | N | N | N | N | N | N | N | P | N | P |

TABLE II-continued

|  | INVENTION HOSES | | | | | | | | COMPARATIVE HOSES | | |
|---|---|---|---|---|---|---|---|---|---|---|---|
|  | 1 | 2 | 3 | 4 | 5 | 6 | 7 | 8 | 9 | 10 | 11 |
|  | *1 | | | | | | | | *2 | | |

*1: No crack was observed.
*2: Cracks were observed.

As is apparent from the test results shown in TABLE II, all of the invention hoses (Examples 1 through 8) exhibit excellent characteristics with regard to the three requirements, flexibility, gas impermeability and heat resistance. In contrast thereto, the first comparative hose (Example 9) whose inner tube consists of a single layer of NBR, suffers from the problem of permitting a large amount of refrigerant gas to permeate therethrough. Therefore, the hose of Example 9 is not suitable for use as a refrigerant 10 transporting hose. The second comparative hose (Example 10) whose inner tube includes a resin layer formed of nylon 6, has an excellent gas impermeability but is unsatisfactory with regard to flexibility. The third comparative hose (Example 11) whose inner tube includes a resin layer formed of nylon 6-66 copolymer, is satisfactory with regard to flexibility and gas impermeability but suffers from low heat resistance.

While the present invention has been described in its presently preferred embodiments with a certain degree of particularity, it is to be understood that the invention is not limited to the precise details of the illustrated embodiments, but may be embodied with various changes, modifications and improvements which may occur to those skilled in the art without departing from the spirit and scope of the invention defined in the following claims.

What is claimed is:

1. A refrigerant-transporting hose comprising:
   an elastic tube through which a refrigerant is transported, said elastic tube including a tubular resinous layer formed of a resinous composition, said resinous composition containing as a major component thereof a polyamide resin produced by reaction of hexamethylene diamine and an aliphatic dicarboxylic acid compound having from eight to sixteen carbon atoms, said resinous composition further containing saponified ethylene-vinyl acetate copolymer.

2. The hose as set forth in claim 1, further comprising an outer tube of a rubber material located radially outwardly of said elastic tube, and
   a reinforcing fiber layer interposed between said elastic tube and said outer tube, such that said reinforcing fiber layer and the elastic and outer tubes constitute an integral tubular body 3. The hose as set forth in claim 1, wherein said elastic tube further includes at least one of an inner rubber layer located radially inwardly of said tubular resinous layer, and an outer rubber layer located radially outwardly of the tubular resinous layer.

4. The hose as set forth in claim 1, wherein said aliphatic dicarboxylic acid is expressed by the following formula:

HOOC—R—COOH where R is an aliphatic residue having from six to fourteen carbon atoms.

5. The hose as set forth in claim 4, wherein said aliphatic dicarboxylic acid comprises at least one acid selected from the group consisting of suberic acid, azelaic acid, sebacic acid, undecanedicarboxylic acid, dodecanedicarboxylic acid, tridecanedicarboxylic acid, tetradecanedicarboxylic acid, pentadecanedicarboxylic acid, and hexadecanedicarboxylic acid.

6. The hose as set forth in claim 1, wherein said resinous composition contains not more than 250 parts by weight of said saponified ethylene-vinyl acetate copolymer per 100 parts by weight of said polyamide resin.

7. The hose as set forth in claim 1 wherein said saponified ethylene-vinyl acetate copolymer contains not more than 40 mol% of ethylene and not less than 90 mol% of the vinyl acetate of the ethylene-vinyl acetate copolymer are saponified.

8. The hose as set forth in claim 1, wherein said resinous composition further contains at least one polyethylene rubber, chlorinated polyethylene, polymer of epichlorohydrin, copolymer of epichlorohydrin and ethylene oxide, chlorinated isobutylene-isoprene rubber, ethylene propylene diene rubber, and acrylonitrile-butadiene rubber.

9. The hose as set forth in claim 8, wherein said resinous composition contains not more than 70 parts by weight of said at least one rubber per 100 parts by weight of said polyamide resin.

10. The hose as set forth in claim 1, wherein said tubular resinous layer has a thickness ranging from 0.05 to 1.0 mm.

11. A refrigerant-transporting hose comprising:
    an elastic tube through which a refrigerant is transported, said elastic tube including a tubular resinous layer formed of a resinous composition, said resinous composition containing as a major component thereof a mixture of saponified ethylene-vinyl acetate copolymer and a polyamide resin produced by reaction of hexamethylene diamine and an aliphatic dicarboxylic acid compound having from eight to sixteen carbon atoms, said elastic tube further including an outer rubber layer located radially outwardly of said tubular resinous layer;
    an outer tube of a rubber material located radially outwardly of said elastic tube; and
    a reinforcing fiber layer interposed between said outer rubber layer of said elastic tube, and said outer tube, such that said elastic tube, reinforcing fiber layer and outer tube constitute an integral tubular body.

12. The hose as set forth in claim 11, wherein said resinous composition consists of said mixture.

13. The hose as set forth in claim 11, wherein said resinous composition contains not more than 250 parts by weight of said saponified ethylene-vinyl acetate copolymer per 100 parts by weight of said polyamide resin.

* * * * *